United States Patent [19]
Desvignes et al.

[11] 3,728,546
[45] Apr. 17, 1973

[54] COMPENSATING ARRANGEMENT FOR THERMAL DETECTORS

[75] Inventors: François Desvignes, Bourg-la-Reine; François-Xavier Doittau, Paris, both of France

[73] Assignee: U.S. Philips Corporation, New York, N.Y.

[22] Filed: Mar. 22, 1972

[21] Appl. No.: 237,178

[30] Foreign Application Priority Data

Mar. 23, 1971 France...............7110179

[52] U.S. Cl..................250/83.3 H, 250/83 R
[51] Int. Cl................................G01j 1/10
[58] Field of Search.............250/83.3 H, 83 R

[56] References Cited

UNITED STATES PATENTS 3,350,033 10/1967 Goldberg.............250/83.3 H X
3,387,134 6/1968 Treharne............250/83.3 H
3,612,879 10/1971 Ohman................250/83.3 H Primary Examiner—Archie R. Borchelt
Attorney—Frank R. Trifari

[57] ABSTRACT

Compensation of radiation towards outer space for horizon sensor thermopiles.

Electronic circuit elements which form part of the device for controlling the compensating source are incorporated in a metallic material which consequently radiates to the thermopiles a thermal power which is proportional to the power which passes through these elements. Thus substantially all the power consumed is used in this source, so that the power consumption is reduced to a minimum. Applications for compensation of radiation towards outer space which gives rise to zero errors in the case of differences in sensitivity between the detectors in the attitude sensors.

5 Claims, 3 Drawing Figures

PATENTED APR 17 1973 3,728,546

COMPENSATING ARRANGEMENT FOR THERMAL DETECTORS

The invention relates to a compensating arrangement for thermal radiation detectors which comprises a source of thermal radiation placed in the field of view of the detectors and outside of their axes and an electronic device for controlling the source. Such a compensating arrangement is more particular suitable for a horizon sensor, comprising thermal radiation detectors, for attitude control of a satellite.

Horizon sensors are known in which the sighting of a star or a planet produces, by means of an optical system, an image on one or several radiation detectors. A horizon sensor comprises two sighting devices each for one of two directions at right angles to one another, north-south and east-west. Each sighting device comprises either two optical systems and at least one thermal detector or one optical system and at least two thermal detectors.

A comparison of the radiation flows received by the different detectors from one star or planet which is taken as a reference datum enables the orientation of the satellite to be determined. If the arrangement is such that the "response" function from the detectors of each sighting device becomes zero when the satellite is oriented in the desired attitude, appropriately when the attitude is actually correct the response obtained from the detectors must be zero and must not be modified by temperature variations of the sensor or differences in sensitivity between the detectors.

When the satellite body is suitably oriented each detector receives exactly the same intensity of radiation. Even a very slight deviation causes the detectors to be differently irradiated. The signals produced by the detectors are transmitted by a comparatively complicated electronic circuit to devices which have the task of restoring the attitude of the satellite.

When because of optical asymmetries due to manufacturing tolerances and because of thermal asymmetries due to inhomogeneities of the material or especially of the distribution of the heat flows or the non-uniformity of distribution of the temperatures about the sensor the amounts of radiation received by each of the thermal detectors are slightly different although the bearing of the satellite is correct, this gives rise to a zero shift which entails a bearing error.

French Pat. Specification No. 2,040,612 (FPHN 4246) proposed a method of compensating paired optical systems which comprise two optical entrance systems associated with a radiation detector. The compensation source is located at a point situated between the optical systems and the detector, a non-treated surface of each optical entrance system, constitutes together with the other elements of the optical system a catadioptric system which optically conjugates the compensation source and the sensitive element. The compensation source comprises thermal quasi-point sources which radiate towards the surface nearest to the source and which receive from a regulating device electric power in accordance with the instantaneous thermal conditions. The resulting compensation is very good but has the drawback that it requires electric power which, although small, is not negligible.

It is an object of the invention to provide for a compensating arrangement in which the zero errors due to the combined effect of the radiation of the thermal detectors to outer space and of their differences in sensitivity to illumination are reduced or even eliminated which arrangement does not show the above-mentioned disadvantage.

The compensating arrangement for thermal detectors according to the invention, is characterized in that the radiation source is constituted by electronic circuit elements which form part of the electronic control device and dissipate thermal energy.

In a preferred embodiment of a compensating arrangement of the invention these components are embedded in a material of high thermal conductivity.

The said material is preferably shaped in the form of a ring the inner diameter of which is approximately equal to the diameter of the optical entrance systems.

This annular material may include chambers for accommodating the electronic components which chambers may be filled with a material having a thermal conductivity substantially equal to that of the material of the ring.

The annular material is preferably bounded by surfaces of revolution about the axis of the optical system, the surface which faces the thermal detector having a high emission factor whilst the other surfaces have low emission factors.

An embodiment of the invention will now be described, by way of example, with reference to the accompanying diagrammatic drawings, in which.

An attitude sensor comprises two optical paths which each extend along one of two rectangular coordinate axes. Each optical path which extends along one of the coordinate axes comprises two groups of two thermopiles. The thermopiles which together form a group are mounted in opposition so that when they are subjected to the same intensity of radiation, the resultant of the voltages produced by all the thermopiles is zero. This would be readily obtainable if the two thermopiles were accommodated in one opaque casing the inner surface of which had a perfectly uniform temperature. However, this is not the case in an attitude sensor in which one of the walls of the casing is an optical window; the thermopiles are accommodated in a casing the temperature of which is about 300° K and see outer space at 4° K through an optical filter which transmits in a given spectral band.

Thus the thermopiles radiate towards outer space and under these conditions the cold junctions are warmer than the hot junctions. When the two thermopiles do not have the same sensitivity the difference of the two voltages produced is not zero. To avoid this parasitic voltage the radiation of the missing wall, i.e. of the window, is replaced by that emitted by an auxiliary source the operation of which is regulated so that the voltage difference becomes zero.

Figure 1:
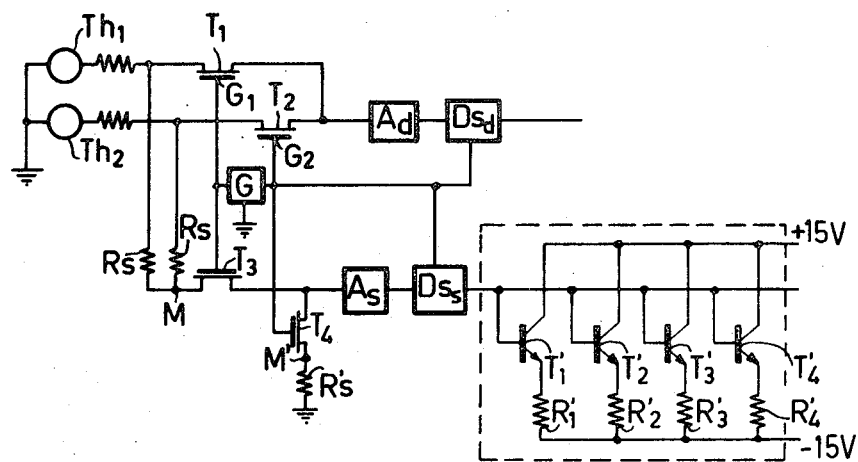
FIG. 1 is the circuit diagram of the compensation device according to the invention.

The circuit shown in FIG. 1 implements the normal method of utilizing the signal for the sensor which measures the difference between the potential differences at the terminals of the thermopiles. For this purpose two transistors T1 and T2 are fed at their gates G1 and G2 with two low alternating voltages which have the same frequency and the same amplitude but are opposed in phase and are supplied by a generator G. Thus, the input of an amplifier Ad is alternately connected to a thermopile Th1 and to a thermopile Th2 and receives an alternating voltage at the frequency of G the amplitude and phase of which depend upon the difference between the voltages supplied by Th1 and Th2 and upon the sign of this difference. The amplified signal is phase-demodulated by a synchronous detector circuit Dsd which receives its reference from G; it provides a direct voltage proportional to the difference of the voltages produced by Th1 and Th2. This signal is used for controlling the attitude of the satellite.

The radiation source according to the invention, which is constituted by electronic circuit elements which belong to the control device and dissipate thermal energy, forms part of the remainder of the circuit. Two resistors Rs which each have a value which is high with respect to (for example 10 times higher than) the internal resistances of the thermopiles Th1 and Th2 (which are shown by equivalent circuits which each comprise a generator and a resistor) produce at a point M a potential difference with respect to earth which is proportional to the mean difference between the potential differences at the terminals of the thermopiles. (the e.m.f. due to the radiation towards outer space is of the order of from 100 to 300 microvolts for the temperature range from $-20°$ C to $+60°$ C when the signal electromotive forces which correspond to a bearing deviation of $0.1°$ are of the order of 2 microvolts). Transistors T3 and T4 connect the input of an alternating amplifier As alternately to the potential of M (the average of the thermopiles) and to that of M' (earth potential O; R's simulates the resistance towards earth of the resistance seen by As through T3, Rs and Th for reasons of symmetry). The signal is phase-demodulated, providing a zero voltage when the mean e.m.f. of the thermopiles is zero (which is characteristic of the normal control state). In this event the voltage at the bases of bipolar transistors T'1, T'2, T'3 and T'4 (which together with resistors R'1, R'2, R'3 and R'4 are accommodated in the aforedescribed annular member to form the compensation source) is at the mean potential between the two voltages applied to the collector (+15 V) and of the emitter (−15 V), and a given amount of dissipation is obtained (for example 17.5 mW for each of the said circuit elements, resulting in an overall dissipation of 140 mW). When the sensor is heated, the d.c. e.m.f. of the thermopiles becomes negative, the mean value of the potential difference at M decreases and consequently a positive voltage is produced at the output of a synchronous detector Dss associated with As, the current passed by the four transistors increases and hence the power dissipated in T'1, T'2, T'3, T'4, R'1, R'2, R'3 and R'4 and the temperature of the compensation source increase, with a consequent decrease of the parasitic negative infrared signal and hence a tendency to neutralize the mean e.m.f. of the thermopiles and therefore also the error due to differences in sensitivity of the two thermopiles.

Known calculations show that a voltage amplification between M and the output of Dss of the order of 500,000 enables thermopiles to be used the sensitivities of which differ by 10 percent in the range from $-20°$ C to $+60°$ C.

Now that the use of active and passive circuit elements which form part of the electronic regulating and attitude control circuit has been explained it will be appreciated that the distribution around the periphery of the window of such circuit elements to compensate for the effect of cold space which the thermopiles see, can only be effected by means of a support on which these elements, in this embodiment four transistors and four resistors, are wired. The distribution of this thermal energy must be ensured in as regular a manner as possible and therefore it is desirable to incorporate the heat-generating elements in a body which has a satisfactory thermal conductivity but at the same time a thermal inertia which is not too high to permit regulation.

Figure 2:
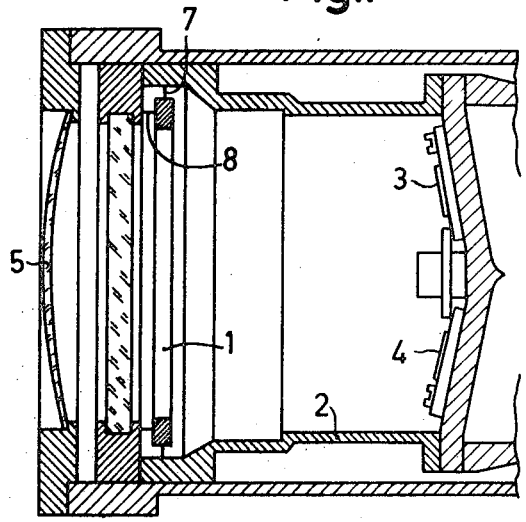
FIG. 2 is a sectional view of a sighting device, comprising a compensating device according to the invention
Figure 3:
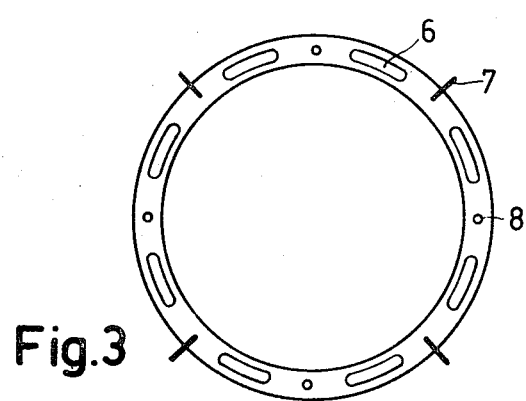
FIG. 3 is a front elevation of the ring which according to the invention may constitute the compensation source.

FIG. 2 shows a compensation source 1 in the form of a metal ring (shown in front elevation in FIG. 3) which is disposed in the body of a casing 2 which contains thermopiles 3 and 4 mounted in opposition. An optical window 5 made of a material which transmits infrared radiation in the band from 14 $\mu$m to 16 $\mu$m has a diameter nearly equal to the inner diameter of the ring 1.

The ring 1 (shown in FIG. 3) is provided with eight bores 6 which are evenly distributed around the circumference and the open ends of which in FIG. 2 face the thermopiles. Eight securing rods are fixed between the bores so as to be spaced from one another by $45°$, four of these rods designated by 7 being arranged radially with respect to the axis of the ring, whilst the remaining four designated by 8 extend to this axis. These rods are provided to hold the ring both in its parallel plane and in its perpendicular plane in the casing 2, and the rods 8 are secured to the wall in which the optical window 5 is mounted. By means of the choice of the diameters of these rods and of the material from which they are made the value of the thermal conductivity by conduction to the casing may be determined.

In a practical embodiment the material of which the ring is made is aluminum and, assuming a possible temperature variation of the order of $1°$ C/min, the thickness of the ring must not exceed 3 mm to permit compensation, the space in the bores not occupied by the circuit elements being filled with a synthetic resin having a thermal conductivity which is not much smaller than that of aluminum.

To ensure that the thermal compensation should be as effective as possible, the surface of the ring facing the thermopiles must have a high emissivity. For this purpose this surface is coated with a product having a high emission factor in the infrared range. The other surfaces (in the embodiment described cylindrical and plane) on the other hand are highly finished (polished) to obtain a low emission factor.

Because the powers dissipated by the components which form the compensation source are comparatively low, very thin electric conductors can be used which do not disturb the thermal equilibrium of the ring.

Thus compensation is provided by the electronic device itself and does not require any other electric power than that normally used for the operation of the electronic device.

Hence, the arrangement according to the invention enables the required operation to be ensured with the minimum consumption of energy — which is an important condition for apparatus on board space vehicles — which is compatible with the given specifications of thermal environment.

What is claimed is:

1. Compensating arrangement for thermal detectors which comprises a source of thermal radiation placed in the field of view of the detectors and outside of their axis and an electronic device for controlling this source, characterized in that the radiation source is constituted by electronic circuit elements which form part of the electronic control device and dissipate thermal energy.

2. Compensating arrangement for thermal detectors as claimed in claim 1, characterized in that the circuit elements are embedded in a material of high thermal conductivity.

3. Compensating arrangement for thermal detectors as claimed in claim 2, characterized in that the said material is shaped in the form of a ring having an inner diameter which is nearly equal to the diameter of the optical entrance system.

4. Compensating arrangement for thermal detectors as claimed in claim 3, characterized in that the said annular material is provided with bores for receiving the electronic circuit elements, which bores are filled with a material of high thermal conductivity, preferably equal to that of the material forming the ring.

5. Compensating arrangement for thermal detectors as claimed in claim 4, characterized in that the said annular material is bounded by surfaces of revolution about the optical axis of the system, the surface facing the thermal detector having a high emission factor whilst the other surfaces have a low emission factors.

* * * * *